US008620899B2

(12) United States Patent
Chen et al.

(10) Patent No.: US 8,620,899 B2
(45) Date of Patent: Dec. 31, 2013

(54) GENERATING MATERIALIZED QUERY TABLE CANDIDATES

(75) Inventors: Dongsheng Chen, Beijing (CN); Hong Min, Poughkeepsie, NY (US); Terence P. Purcell, Springfield, IL (US); Yefim Shuf, Yorktown Heights, NY (US); Xiaobo Wang, Beijing (CN); Zhongliang Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/702,384

(22) Filed: Feb. 9, 2010

(65) Prior Publication Data

US 2011/0196857 A1 Aug. 11, 2011

(51) Int. Cl.
*G06F 17/30* (2006.01)
*G06F 7/00* (2006.01)
(52) U.S. Cl.
USPC ........................................ 707/714; 707/717
(58) Field of Classification Search
USPC ................................................ 707/714, 717
See application file for complete search history.

(56) References Cited

U.S. PATENT DOCUMENTS

| | | | |
|---|---|---|---|
| 5,897,632 A * | 4/1999 | Dar et al. ................ | 707/999.001 |
| 5,913,207 A * | 6/1999 | Chaudhuri et al. ..... | 707/999.001 |
| 6,366,903 B1 * | 4/2002 | Agrawal et al. ........ | 707/999.002 |
| 6,513,029 B1 * | 1/2003 | Agrawal et al. ........ | 707/999.002 |
| 6,850,933 B2 * | 2/2005 | Larson et al. .......... | 707/999.004 |
| 6,882,993 B1 * | 4/2005 | Lawande et al. ....... | 707/714 |
| 6,957,225 B1 * | 10/2005 | Zait et al. .............. | 707/999.002 |
| 7,007,006 B2 * | 2/2006 | Zilio et al. ............. | 707/717 |
| 7,089,225 B2 | 8/2006 | Li et al. | |
| 7,191,169 B1 * | 3/2007 | Tao ........................ | 707/714 |
| 7,246,115 B2 | 7/2007 | Zhang et al. | |
| 7,249,120 B2 | 7/2007 | Bruno et al. | |
| 7,302,422 B2 | 11/2007 | Bossman et al. | |
| 7,383,256 B2 | 6/2008 | Larson et al. | |
| 7,536,379 B2 * | 5/2009 | Purcell .................. | 707/999.003 |
| 7,689,538 B2 * | 3/2010 | Li et al. ................ | 707/999.002 |
| 7,716,214 B2 * | 5/2010 | Li et al. ................ | 707/719 |
| 7,840,553 B2 * | 11/2010 | Lawande ............... | 707/714 |
| 2007/0033160 A1 | 2/2007 | Santosuosso | |
| 2007/0174292 A1 * | 7/2007 | Li et al. ................ | 707/10 |

(Continued)

OTHER PUBLICATIONS

Lehner et al., "fAST Refresh using Mass Query Optimization," 17th International Conference on Data Engineering (ICDE'01), 2001.

(Continued)

*Primary Examiner* — Pavan Mamillapalli
(74) *Attorney, Agent, or Firm* — Eustus Dwayne Nelson; Ryan, Mason & Lewis, LLP

(57) ABSTRACT

Techniques for generating a set of one or more materialized query table (MQT) candidates for a workload are provided. The techniques include receiving a workload, wherein the workload comprises a set of one or more queries, generating one or more best matching MQTs (BMQTs) based on one or more query blocks of the one or more queries by removing syntax that is not qualified for a MQT re-write, determining one or more frequently used multi-joins in the workload, using the one or more BMQTs and the one or more frequently used multi-joins to generate a set of one or more workload MQTs (WMQTs), and grouping one or more WMQTs and one or more BMQTs into one or more groups to merge into a set of a smaller number of MQTs and to cover the workload.

24 Claims, 10 Drawing Sheets

(56) References Cited

U.S. PATENT DOCUMENTS

| | | |
|---|---|---|
| 2007/0250524 A1 | 10/2007 | Le |
| 2008/0027907 A1 | 1/2008 | Brown et al. |
| 2008/0033912 A1 | 2/2008 | Bossman et al. |
| 2008/0097962 A1 | 4/2008 | Santosuosso |
| 2008/0177700 A1* | 7/2008 | Li et al. .................. 707/3 |
| 2008/0183667 A1* | 7/2008 | Li et al. .................. 707/2 |
| 2009/0177621 A1* | 7/2009 | Le et al. .................. 707/2 |
| 2009/0177697 A1 | 7/2009 | Gao et al. |

OTHER PUBLICATIONS

Bello et al. "Materialized Views in Oracle", Proc of the 24th VLDB Conference, New York, USA, 1998.

Gao et al.; Provisioning Deployment of Materialized Views and Indices for Data Warehouse Operation Schedule.

Phan et al.; "Dynamic Materialization of Query Views for Data Warehouse Workloads."

Xie et al.; Adaptive Query Correlation Aware Workload Execution Ordering.

Scheuermann et al.; "Dynamic Integration and Query Processing with Ranked Role Sets."

Jiang et al.; "Exploiting Correlation and Parallelism of Materialized View Recommendation for Distributed Data Warehouse," IEEE 23rd Inter. Conf. Apr. 15-20, 2007, pp. 276-285.

D. Gao et al., "Provisioning Deployment of Materialized Views and Indices for Data Warehouse Operation Schedule," ip.com, IPCOM000176163D, Nov. 2008, 10 pages.

T. Phan et al., "Dynamic Materialization of Query Views for Data Warehouse Workloads," IEEE 24th International Conference on Data Engineering, Apr. 2008, pp. 436-334.

J. Xie et al., "Adaptive Query Correlation Aware Workload Execution Ordering," ip.com, IPCOM000176156D, Nov. 2008, 14 pages.

P. Scheuermann et al., "Dynamic Integration and Query Processing with Ranked Role Sets," IEEE, First International Conference on Cooperative Information Systems (IFCIS), Jun. 1996, pp. 157-166.

* cited by examiner

*FIG. 2*

| X \ Y | JOIN #0 T1(C1)-T2(C1) | JOIN #1 T1(C2,C3)-T2(C2,C3) | JOIN #2 T1..-T3.. | JOIN #3 T1..-T4.. | JOIN #4 T2..-T4.. | JOIN #5 T3..-T5.. |
|---|---|---|---|---|---|---|
| JOIN #0 | 20 | 0 | 8 | 6 | 0 | 8 |
| JOIN #1 | -1 | 10 | 0 | 10 | 0 | 0 |
| JOIN #2 | -1 | -1 | 10 | 5 | 5 | 3 |
| JOIN #3 | -1 | -1 | -1 | 15 | 8 | 0 |
| JOIN #4 | -1 | -1 | -1 | -1 | 9 | 0 |
| JOIN #5 | -1 | -1 | -1 | -1 | -1 | 8 |

Table 302:

| | J0 | J1 | J2 | J3 | J4 | J5 | J6 | J7 | J8 | J9 | J10 | J11 | J12 | J13 | J14 |
|---|---|---|---|---|---|---|---|---|---|---|---|---|---|---|---|
| J0 | 20 | — | — | — | — | — | — | — | — | — | — | — | — | — | — |
| J1 | 19 | 19 | — | — | — | — | — | — | — | — | — | — | — | — | — |
| J2 | 19 | 18 | 19 | — | — | — | — | — | — | — | — | — | — | — | — |
| J3 | 11 | 10 | 11 | 11 | — | — | — | — | — | — | — | — | — | — | — |
| J4 | 19 | 18 | 19 | 11 | 19 | — | — | — | — | — | — | — | — | — | — |
| J5 | 19 | 18 | 18 | 10 | 18 | 19 | — | — | — | — | — | — | — | — | — |
| J6 | 17 | 16 | 16 | 10 | 16 | 16 | 17 | — | — | — | — | — | — | — | — |
| J7 | 4 | 3 | 4 | 1 | 4 | 4 | 4 | 4 | — | — | — | — | — | — | — |
| J8 | 7 | 7 | 6 | 6 | 6 | 7 | 6 | 0 | 7 | — | — | — | — | — | — |
| J9 | 2 | 2 | 2 | 0 | 2 | 2 | 1 | 0 | 2 | 2 | — | — | — | — | — |
| J10 | 1 | 1 | 1 | 0 | 1 | 1 | 1 | 0 | 0 | 1 | 1 | — | — | — | — |
| J11 | 18 | 18 | 17 | 9 | 17 | 17 | 15 | 3 | 0 | 0 | 1 | 18 | — | — | — |
| J12 | 2 | 1 | 2 | 1 | 2 | 2 | 2 | 0 | 0 | 1 | 0 | 2 | 2 | — | — |
| J13 | 2 | 2 | 2 | 0 | 2 | 2 | 2 | 0 | 0 | 0 | 2 | 0 | 2 | 2 | — |
| J14 | 1 | 0 | 1 | 1 | 1 | 1 | 1 | 0 | 0 | 0 | 0 | 1 | 0 | 1 | 1 |

FIG. 4

| | J0 | J1 | J2 | J3 | J4 | J5 | J6 | J7 | J8 | J9 | J10 | J11 | J12 | J13 | J14 |
|---|---|---|---|---|---|---|---|---|---|---|---|---|---|---|---|
| J0 | 20 | 19 | 19 | 11 | 19 | 19 | 17 | 4 | 7 | 2 | 1 | 18 | 2 | 2 | 1 |
| J1 | -1 | 19 | 18 | 10 | 18 | 18 | 16 | 3 | 7 | 2 | 1 | 18 | 1 | 2 | 0 |
| J2 | -1 | -1 | 19 | 11 | 19 | 18 | 16 | 4 | 6 | 2 | 0 | 17 | 2 | 2 | 1 |
| J3 | -1 | -1 | -1 | 11 | 11 | 10 | 10 | 1 | 6 | 0 | -1 | 9 | -1 | 0 | -1 |
| J4 | -1 | -1 | -1 | -1 | 19 | 18 | 16 | 4 | 6 | 2 | 1 | 17 | 2 | 2 | 1 |
| J5 | -1 | -1 | -1 | -1 | -1 | 19 | 16 | 4 | 7 | -1 | -1 | 17 | 2 | 2 | 1 |
| J6 | -1 | -1 | -1 | -1 | -1 | -1 | 17 | 4 | 6 | -1 | 0 | 15 | 2 | 2 | 1 |
| J7 | -1 | -1 | -1 | -1 | -1 | -1 | -1 | -1 | 0 | 2 | 0 | 3 | 0 | 0 | -1 |
| J8 | -1 | -1 | -1 | -1 | -1 | -1 | -1 | -1 | 7 | -1 | 0 | 0 | -1 | 0 | -1 |
| J9 | -1 | -1 | -1 | -1 | -1 | -1 | -1 | -1 | -1 | -1 | -1 | 0 | 0 | 0 | -1 |
| J10 | -1 | -1 | -1 | -1 | -1 | -1 | -1 | -1 | -1 | -1 | -1 | 1 | -1 | 0 | -1 |
| J11 | -1 | -1 | -1 | -1 | -1 | -1 | -1 | -1 | -1 | -1 | -1 | -1 | 0 | 2 | -1 |
| J12 | -1 | -1 | -1 | -1 | -1 | -1 | -1 | -1 | -1 | -1 | -1 | -1 | -1 | 0 | 0 |
| J13 | -1 | -1 | -1 | -1 | -1 | -1 | -1 | -1 | -1 | -1 | -1 | -1 | -1 | -1 | -1 |
| J14 | -1 | -1 | -1 | -1 | -1 | -1 | -1 | -1 | -1 | -1 | -1 | -1 | -1 | -1 | 1 |

JOIN MATRIX TRAVERSAL PATH

| J0 | J0, J1 | J0, J1, J2 | J0, J1, J2, J4, J5 | ... | J0, J2... | J0, J2, J4... | ... |

Ⓑ FROM FIG. 7

734 — IS THE ROOT A COMPOUND PREDICATE?

736 — IS THE OPERATOR AND? — YES →

738 — ADD OPERATOR AND TO wrRoot

740 — ITERATE THROUGH CHILDREN OF INPUT ROOT

742 — ADD A CHILD TO wrRoot BY CALLING BUILD PREDICATES () USING THE CHILD AS INPUT ROOT

NO →

744 — IS THE OPERATOR OR? — YES →

746 — CREATE A NEW PREDICATE CALLED orRoot AND SET ITS OPERATOR AS OR

748 — ITERATE THROUGH CHILDREN OF INPUT ROOT

750 — ADD A CHILD TO wrRoot BY CALLING BUILD PREDICATES() USING THE CHILD AS INPUT ROOT

752 — END OF ITERATION

754 — DOES orRoot HAVE SAME NUMBER OF CHILDREN AS INPUT ROOT? — YES →

756 — ADD orRoot AS A CHILD TO wrRoot

Ⓒ TO FIG. 7

GENERATING MATERIALIZED QUERY TABLE CANDIDATES

FIELD OF THE INVENTION

Embodiments of the invention generally relate to information technology, and, more particularly, to materialized query tables.

BACKGROUND OF THE INVENTION

A materialized query table (MQT) is a database table that contains a pre-computed result of a query or sub-query (a sub-query is also referred to herein as a query block). The expectation is that the same query or sub-query will be executed repeatedly. When the same query or sub-query is executed again, then a MQT substitutes the query to serve the result much faster. MQTs (also referred to as materialized views (MVs), summary tables, etc.) are widely used in database systems to improve the performance of complex queries against large databases in workloads such as decision support, data warehousing, analytics and reporting.

MQT technology improves query workload performance by pre-computing and storing the results of queries or sub-queries, and substituting the complete or partial subsequence query processing with the pre-computed results where applicable.

In adopting an MQT approach, one must undertake tasks such as defining and creating a set of MQTs (and optionally one or more indexes on those MQTs) that will likely benefit upcoming query workloads. A set of MQTs can have one or more MQTs. Another task can include substituting the queries with the most appropriate MQTs to maximize performance gains.

Defining a set of MQTs requires a high-level of database administration and performance analysis skills, as well as the understanding of the query workloads. For the users of MQTs, it is strongly desirable to have an automatic tool that can advise on what MQTs to define. There are many factors that an MQT advising tool should put into consideration to make good MQT recommendations. Those factors can include, but are not limited to, database system information, database statistics, workload characteristics and execution and frequency patterns, system constrains and user defined constrains, etc.

Existing MQT selection process approaches are missing techniques to generate MQT recommendations via a way of considering the potential maximum gain for some of the individual queries in the workload and the potential total performance gain of the entire workload. Workload information such as a schema pattern and an execution frequency pattern are among the important factors for MQT recommendation.

SUMMARY OF THE INVENTION

Principles and embodiments of the invention provide techniques for generating materialized query table (MQT) candidates and a consolidated set of MQTs suitable for deployment on a host system. An exemplary method (which may be computer-implemented) for generating a set of one or more materialized query table (MQT) candidates for a workload, according to one aspect of the invention, can include steps of receiving a workload, wherein the workload comprises a set of one or more queries, generating one or more best matching MQTs (BMQTs) based on one or more query blocks of the one or more queries by removing syntax that is not qualified for a MQT re-write, determining one or more frequently used multi-joins in the workload, using the one or more BMQTs and the one or more frequently used multi-joins to generate a set of one or more workload MQTs (WMQTs), and grouping one or more WMQTs and one or more BMQTs into one or more groups to merge into a set of a smaller number of MQTs and to cover the workload.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating an example of a join matrix, according to an embodiment of the present invention;

FIG. 3 is a diagram illustrating an exemplary join matrix, according to an embodiment of the present invention;

FIG. 4 is a diagram illustrating finding common joins via traversing a join matrix, according to an embodiment of the present invention;

DETAILED DESCRIPTION OF EMBODIMENTS

Principles of the invention include generating materialized query table (MQT) candidates for a database query workload. One or more embodiments of the invention include discovering common join patterns in a captured workload and composing MQT candidates based on the discovery. Common operation types in a query can include, by way of example, select (projection of a column subset of a table), predicates (projection of a row subset of a table), group by (aggregation on the same attributes), order by (sorting on the same attributes) and join (projections and augmentations).

Additionally, as used herein, a "single join" is a join between two tables. Information that can be used to record a single join includes, for example, a unique identifier of this join in the workload, left and right hand side tables, left and right hand side columns, frequency (that is, the count of the join that appears in different query blocks in workload (0 means RI)), identities (IDs) of queries or sub-queries that use this join. As used here, RI stands for referential integrity between two tables. The RI is treated as a 0-frequency join if there is no join actually discovered in the workload.

Also, a data structure is used to represent join characteristics. One such data structure can be a matrix. A "join matrix" is the join frequency dependency matrix. The size of the dimensions of the join matrix is total number of distinct single joins in the workload. The matrix index can be ordered, for example, from low to high based on descending table size order for the single joins. Other ways include via customer-specified weight on the tables. The single join (if it exists) from the two largest tables is the first join listed. An element on the diagonal indicates how many times a particular single join occurs in the workload. This is also called a head join for the row of matrix on which it resides. All other elements to the right side of the diagonal line in the matrix show how many times the other joins occur when the corresponding head join occurs. Further, in one or more embodiments of the invention, the lower left part of the matrix below the diagonal is not used.

Additionally, as used herein, types of MQTs referred to herein can include "best matching MQTs" (BMQTs), as well as "workload MQTs" (WMQTs).

Figure 1:
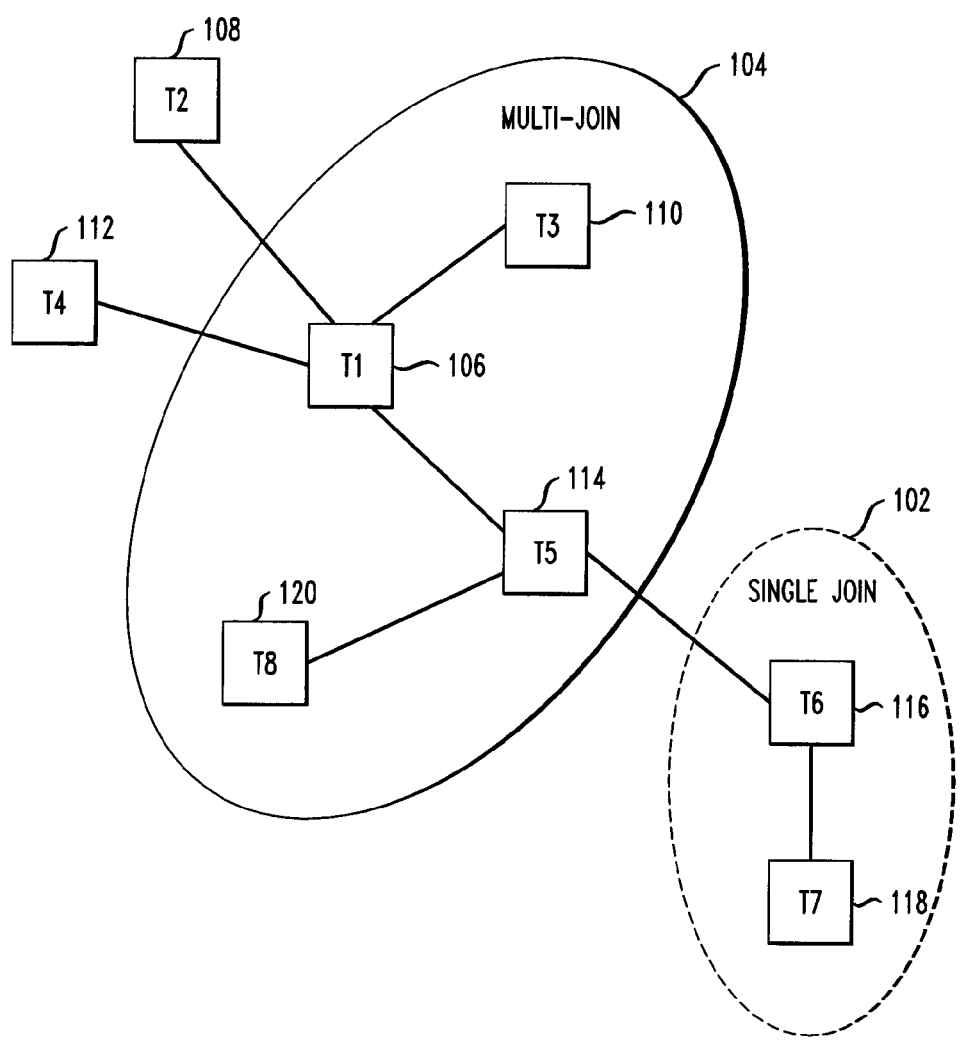
FIG. 1 is a diagram illustrating an example of a multi-join and a single join, according to an embodiment of the present invention.

FIG. 1 is a diagram illustrating an example of a multi-join and a single join, according to an embodiment of the present invention. By way of illustration, FIG. 1 depicts table 1 (component 106), table 2 (component 108), table 3 (component 110), table 4 (component 112), table 5 (component 114), table 6 (component 116), table 7 (component 118) and table 8 (component 120). FIG. 1 also depicts a single join 102 that includes tables T6 and T7, and a multi-join 104 that includes tables T1, T3, T5 and T8.

Additionally, FIG. 2 is a diagram illustrating an example of a join matrix 202, according to an embodiment of the present invention. By way of illustration, FIG. 2 depicts a matrix that includes head lines (both X and Y) constituting a "Head Join." FIG. 2 depicts joins between pairs of tables. Within each join, the table with a higher weight is placed at the left side. Within a head line, the join with the table with a higher weight is placed at the left/top side; the table with the lowest weight is placed at the right/bottom side. If the left sides of two joins have the same table, the join is placed with a bigger right-side-table to the left/top. In the matrix depicted in FIG. 2, one knows that, for example, the combined weight of T1 and T2 is higher than that of T1 and T3, and further higher than that of T1 and T4, etc.

FIG. 2 also depicts cells in table content, including, for example, the quantity of column-title joins which appear in the same query block of the row-title joins. As an example, the cell (0, 3) (shaded in FIG. 2) indicates there are 6 times that T1 joins T4 when T1(C1) joins T2(C1) in the workload. Also, the cells in the diagonal indicate how many times a particular single join occurs in the workload. As this matrix is symmetrical, all the cells below the diagonal are set, for example, to −1 to indicate that they are not used.

As detailed herein, a "head join" is a single join in the join matrix whose occurring frequency appears at a corresponding diagonal element of the join matrix. A join matrix also maintains a list of ordered head join, which can be referred to as "HeadJoinList."

If an undirected graph G is used to represent the relationships of tables and joins in a sub-query, where nodes in the graph represents tables and edges between any two nodes represents a join relationship between the two tables represented by the two nodes, a "Connected MultiJoin" is a collection of single joins that can be represented by a sub-graph where any two nodes are reachable from each other via other nodes or edges in the same sub-graph. As described herein, the term "multi-join" is short for "connected multi-join." The information representing a multi-join includes single joins IDs, as well as information such as subQueryIDs, queryIDs and base tables that the multi-join covers. Additionally, a "Multi Join List" is a collection of multi-joins.

The techniques described herein can include receiving a workload that includes a set of queries, generating a best matching MQT (BMQT) for each query (sub-query) by removing the syntax that is not qualified for a MQT re-write, and finding frequently used multi-joins in the workload (for example, by building a data structure encoding multi-joins in the workload). One or more embodiments of the invention additionally include using a join matrix to find a list of commonly used multi-joins as a common join list, and sorting all multi-joins by defined ordering criteria. The techniques detailed herein can also include generating a set of workload MQTs (WMQTs) from the BMQTs (or, alternatively, workload queries/sub-queries) and commonly multi-joins, grouping all WMQTs and BMQTs as a broad set of MQT candidates for further merging.

One or more embodiments of the invention include identifying common multi-joins using a join matrix, identifying a factor of defining common joins, and using update frequency as one of the input parameters when determining the importance of a table. Parameters can include, by way of example, the following:

Table weight and ordering: Consider a combination of factors such as table size (number of rows or disk space consumed), user specified weight and table update frequency.

Join weight and ordering, which are based on combined weight (size and/or user-specified weight) of two tables in the join.

HeadJoin Frequency: whether a head-join is important enough to be used as a start point for common join discovery.

DependentJoin Frequency: whether a new join (that contains more than two joins) is important enough to add and grow an existing multi-join (or head join).

DeltaJoin Frequency: The difference between the percentage of sub-queries that a multi-join covers and the percentage covered after the next single join is added to this multi-join. If the difference is high enough (that is, greater than a threshold), it means this multi-join should be used to construct WMQT separately.

MultiJoin Ordering: How to compare the importance of any two multi-joins for sorting, considering a combination of factors such as table size/weight, workload coverage and weight, and number of single joins covers.

The techniques detailed herein include modeling join patterns. A join can be represented by two columns from two different tables in the workload. Some joins can also be defined in the database schema. In one or more embodiments of the invention, joins are ranked by characteristics such as table sizes of the two tables, or user-specified weight values, and the frequencies of all joins in the workload are recorded in a data structure such as a matrix (for example, a join matrix). Frequencies can be stored in diagonal elements of the matrix as well. One or more embodiments of the invention also include recording the frequency of co-existence n a query) of a lower ranked join with respect to a higher ranked join, as well as storing in elements above the diagonal.

FIG. 3 is a diagram illustrating yet another exemplary join matrix 302, according to an embodiment of the present invention. By way of example, in FIG. 3, element (J0, J3) represents that the frequency of J3 co-exists with J0 within the same query block in the workloads. This join matrix is built by traversing all of the queries in the workload. Starting from the first query analyzed, each single join is weighted and ordered to initialize the join matrix. With subsequent queries, single joins will be first weighted and ordered in the same manner as the first query. Then, the join matrix will be enlarged if there are joins that do not exist in it yet. Also, the cells for the header join and co-exist joins in the matrix will be updated for the query.

One or more embodiments of the invention additionally include discovering common join patterns in a workload. A matrix can be traversed recursively to record important common connected multi-joins in the workload based on certain formulated criteria. The connection can be dictated by those elements above diagonal line, and importance can be measured, for example, by certain criteria such as frequencies of joins and sizes of tables included. Also, the queries in which each common join exists can be recorded.

FIG. 4 is a diagram illustrating finding common joins via traversing a join matrix, according to an embodiment of the present invention. By way of illustration, FIG. 4 depicts, within join matrix 402, a join matrix traversal path 404 that includes joins "J0," "J0, J1," "J0, J1, J2," "J0, J1, J2, J4, J5," " . . . ," "J0, J2 . . . ," "J0, J2, J4 . . . " and " . . . ." The " . . . " represent additional joins found in between the listed join during the matrix traversal path.

In one or more embodiments of the invention, users of MQTs can use an automatic tool that can advise on what MQTs to define. There are many factors that an MQT advising tool should put into consideration to make good MQT recommendations. Those factors include, but are not limited to, database system information, database statistics, workload characteristics and execution and frequency patterns, system constrains and user defined constrains, etc. In contrast to existing approaches, the techniques described herein include generating MQT recommendations via considering the potential maximum gain for some of the individual queries in the workload and the potential total performance gain of the entire workload. Workload information such as a schema pattern and an execution frequency pattern are among the factors for MQT recommendation.

Based on the characteristics and usage patterns learned from workload mining, one or more embodiments of the invention can generate a broad set of MQT candidates. Any candidate in the set either benefits individual queries in the workload to the maximum extent or benefits a broad subset of queries in the workload. The entire set of candidates can later be consolidated to a smaller set for further selection process within system and user-specified space and other constrains.

In one or more embodiments of the invention, one subset of the candidates can include the queries themselves that are qualified by a query optimizer for query substitution re-write during query execution. This type of MQT, as detailed herein, is referred to as BMQT, as it is derived from a query block and the benefit of using one such BMQT is maximized if the same query block is executed again. This is not to imply, for example, that these BMQT cannot be consolidated later to reduce the number of MQTs and broaden their coverage for the workload.

Another subset can be based on frequently executed multi-joins detected by mining the workload (or, for example, via other means). This type of candidate, as detailed herein, is referred to as a WMQT, as each MQT is generated based on most common join patterns in the workload and the use of these MQTs will likely benefit more queries in the workload than BMQTs (that is, a broader coverage for a workload). The information learned from mining the join relationships among query tables and their execution patterns can be used to generate the second subset. This broad candidate set can later be consolidated into smaller set to broaden the potential workload coverage of each MQT candidate.

In one or more embodiments of the invention, database tables are normalized to reduce data redundancy and can therefore improve update performance. However, this may be at the expense of query performance as tables must be re-joined in the query. As detailed herein, pre-joining a group of tables that frequently exhibit join relationship in a query workload and storing the result as a MQT can improve query processing performance not by only reducing the computation cost, but also reducing query optimization time (reduce search space) and structure build time during execution.

One or more embodiments of the invention include receiving a workload that includes a set of queries, and analyzing the workload to obtain information that may include table and index statistics, join relationships between joined tables and columns, the number of occurrences (frequency) of each join in the workload, and the association of the queries with these joins, referential integrity (RI) constraints among tables. A BMQT can be generated for each query (or sub-query) by removing the syntax that is not qualified for a MQT re-write.

A data structure can be built to record the join relationship and usage patterns.

The data structure can be a matrix (for example, a matrix referred to as join matrix J_M). The total number of different two-table joins (that is, single joins) seen in the workload can be denoted, for example, as J. Joins using different columns between the same two tables are considered as different joins. Further, one or more embodiments of the invention include setting the matrix size as J×J and initialize all of its elements to 0.

All of the J joins can be sorted, by way of example, based on the combined importance of the joined tables in the workload. By way of example and not limitation, if T1 is more important than T2, and T2 is more important than T3, and if there is a join between any two of the three tables denoted by (T1,T2), (T2,T3), (T1,T3), then the sort order of the joins is (T1,T2), (T1,T3), (T2,T3) because the combined importance order is T1+T2>T1+T3>T2+T3. The importance of the table can be defined, for example, as table size such as the number of rows or physical table space size, a user specified weight, or a combination of any of these and other factors via a user defined function. Also, the list of sorted joins can be denoted as S_J, and S_J[k] represents the k-th ordered join.

One or more embodiments of the invention include storing the frequency of each join in the workload in the join matrix J_M. For example, element J_M[k,k] represents the join frequency of the k-th join in S_J. Also, the "dependent join frequency" of less important joins with respect to more important joins can be recorded. For each two-table join, one or more embodiments of the invention can include recording the frequency of all other less important single joins occurring in the same query (sub-query). For example, M_J (k,m) (k>m) represent the number of occurrences when m-th join occurs in the same query (sub-query) with the k-th join. The m-th join is referred to in this instance as a "dependent join" of k-th.

Alternatively, for each single join, one or more embodiments of the invention can record the dependent join frequency of single joins that are connected to this single join, wherein "connected" in this instance refers to the notion that the two single joins share at least one same table.

One or more embodiments of the invention additionally include using join matrix J_M to find a list of commonly used multi-joins (a common join list). By way of example, FIG. 4 depicts how a join matrix can be traversed to find a list of common joins. Starting from the most important single join, traverse join matrix J_M, and iterate the following step for all single joins. If a single join frequency is higher than a certain threshold for the workload, then the single join is added to the multi-join list. Further, iterate the following step for all connected single joins of this join. If a connected dependent join of the single join qualified has a dependent join frequency higher than a certain threshold for the workload, connect the two joins to a multi-join and add to the multi-join list. The multi-join's join frequency is defined by the number of queries that contain all of the single joins in the multi-join, using the information obtained as detailed above. One or more embodiments of the invention include keeping track of the sets of query IDs covered by each join and multi-join, and using set intersection to find multi-join's join frequency. The threshold can be selected, for example, by tuning the tool on workloads.

For a multi-join mj1 qualified in the previous step, one or more embodiments of the invention can include using the last single join in the multi-join, finding its connected single joins and connecting to the multi-join as a new multi-join mj2. If the new multi-join's frequency is higher than a certain threshold for the workload, the new multi-join can be added to the multi-join list. Also, in one or more embodiments of the invention, if mj2's frequency is the same mj1, mj1 can be removed from the multi-join list. Additionally, even if a new multi-join's frequency is not higher than a certain threshold for the workload but the newly added single join is defined as an RI constrain relationship; one or more embodiments of the invention can still add the new multi-join to the multi-join list. Further, the above steps can be recursively or iteratively repeated until all possible multi-joins have been explored.

Additionally, one or more embodiments of the invention include sorting all multi-joins by defined order criteria. The criteria can be, for example, a formula with parameters describing the combined size or weight of the tables in the join, the frequency of a multi-join, the number of queries covered by this multi-join, the estimated or a query optimizer calculated cost of a multi-join, etc. Associated information of the queries relevant to each multi-join can be obtained and also saved.

Another factor that can be used as a parameter, when defining importance of tables and common-joins, is how often the original tables are updates. The content of the MQT needs to be refreshed when base tables that are used to construct the MQT are updated. Often this is not a trivial cost and is done in a limited batch window time. To reduce this cost, one might favor to construct MQT with less frequently updated tables. One way to influence the common join outcome by this update frequency factor is to use update frequency as one of the input parameters when determining the importance of a table. The more frequently a table is updated, the less important the table is. A table that is updated less frequently can be considered more important in the steps detailed above.

Further, one or more embodiments of the invention include generating a set of WMQTs from the BMQTs (or, alternatively, from workload queries/sub-queries) and common multi-joins. The maximum number (maxW) of WMQTs generated for each BMQT can be defined by a user or can be a number adjusted based on the information from the workload. Also, the techniques detailed herein can include iterating through each BMQT and its associated query identifier. From the ordered multi-join list, the top maxW multi-joins that cover this BMQT (query) can be found. From the ordered multi-join list, one or more embodiments of the invention can additionally include finding the top maxW multi-joins that cover this BMQT (query) and have less (fewer) tables than the BMQT.

The WMQTs can be built by adding the same select, aggregation and predicate clauses from BMQT to the multi-joins. The clauses that are used on tables not in the multi-joins are not added. Any predicate clause that causes the WMQTs' results to be a smaller subset of the BMQT (with respect to the number of rows) is not added. One example of such a predicate is an OR combination predicate connecting a basic (local) predicate on a table in a multi-join and a basic (local) predicate on a table that is in BMQT but not in a multi-join. Additionally, all WMQTs and BMQTs can be grouped as a broad set of MQT candidates.

In one or more embodiments of the invention, the join matrix and associated statistics can also be used to identify special schema such as a star schema or an extended star schema (a snowflake schema) after a few reasonable assumption are first established. The following lists some exemplary assumptions.

The fact table is the largest among all tables in a star schema.

Referential integrities (RIs) are defined between the fact table and each of the dimension tables.

The fact table is joined to at least a few different tables in the entire workload.

The fact table is the child in all its join relationships, where the parent table is the one whose join column is its unique key.

Referential integrities (RIs) are defined between a dimension table and each of its snowflake tables.

Dimension tables are not joined to each other.

With such assumptions, existing star schemas can be identified in the workload by following the "connected" elements in the join matrix using a flow such as the following example. The assumptions above imply that if there exists a star schema in the workload, and if the join matrix is sorted by join size of table rows in descending order, the first join will include a fact table. One possible flow, by way of example, to use join matrix, identify that star exists and to find stars includes:

1) Sort join matrix M by join size on number of table rows in descending order.
2) Assuming the larger table in the first join is a fact table (F1).
3) Find all tables joined to F1, Di ($i \geq 3$); otherwise, not a star.
4) For joins (F1, D1), (F1,D2) . . . (F1,Di), determine that there is at least there a co-occurrence for any two of them (referred to as co-occurrence "dependent" herein). This can be checked by examining dependent frequency of between any two of (F1,Di) (i=1, 2, . . . ); otherwise, not a star.
5) Identify that there are no direct joins between any Di in the join matrix; otherwise, not a star.
6) Record the star by saving it into a new star object/data structure (F1, D1, D2 . . . ).
7) Reduce join matrix size by removing rows and columns of (F1,Di); the new matrix is M'.
8) Identify if there is another fact table using the same dimension/snowflake in the workload by repeating step 2)-7) on M'.

9) Once there is no more fact table using the same dimension/snowflake, find snowflake tables for each dimension table for the stars recorded in step 6 using the remaining join matrix.
10) Reduce join matrix size by removing all joins in step 9.
11) Check if the remaining join matrix contains more stars that do not share fact and dimension/snowflake tables that have been recorded in step 6 tables by repeating steps 1 through 10.

Once a star schema is identified, one or more embodiments of the invention can be used to recommend materialized views in star schemas.

In one or more embodiments of the invention, another way of identifying a star join and fact table can include the following flow:
1) Using a group of tables that are "connected" via joins.
2) One of the tables appears in joins more than other tables, and this table is the child of all tables joined to it. (Parent is the table whose join column is unique). As such, this table can be identified as fact table. Additionally, there might be a dimension table that is joined equally; and one or more embodiments of the invention can recursively do the following: assume it is a 'fact,' then find its child which is the real fact.

As described herein, one or more embodiments of the invention also include identifying "important" common joins. This part of the algorithm attempts to find "important" connected multi-joins via a join matrix. "Importance" can be measured, for example, by applying a weight function on joins and setting certain threshold on the weight. One or more embodiments of the invention also covers cases when a multi-join is disconnected, by treating it as more than one connected "smaller" multi joins.

Figure 5:
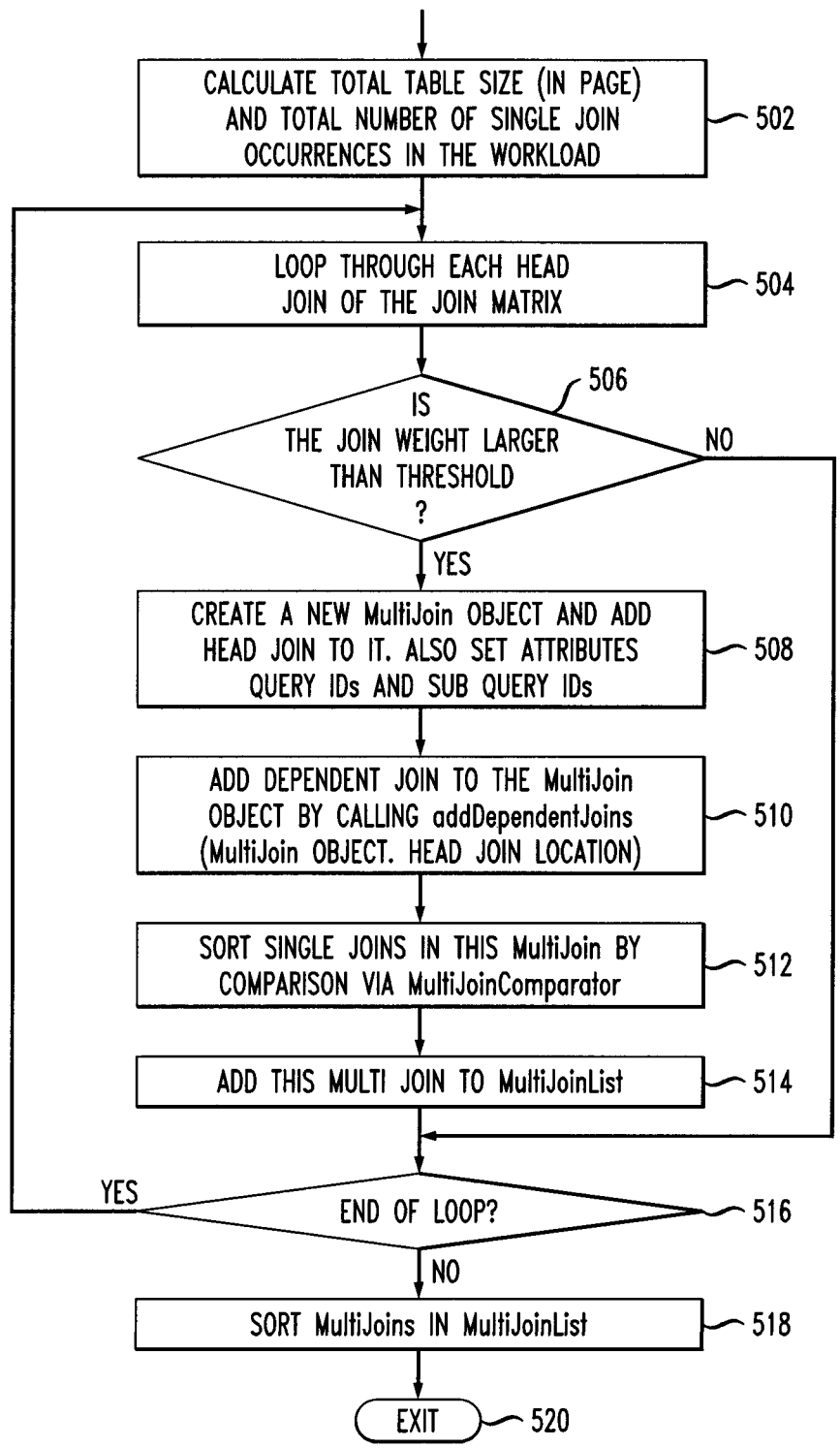
FIG. 5 is a flow diagram illustrating finding connected common joins, according to an embodiment of the present invention.

FIG. 5 is a flow diagram illustrating finding connected common joins, according to an embodiment of the present invention. Step 502 includes calculating a total table size (in pages) and total number of single join occurrences in a workload. Step 504 includes looping through each head join of the join matrix. Step 506 includes determining whether the join weight is larger than a threshold. An example of join weight in FIG. 5 can be defined as:

((join_table_1_size+join_table_2_size)/(total_table_size_in_the_workload))*(Join_frequency/total_single_join_count_in_the_workload).

If the join weight is not larger than the threshold, then the flow proceeds to step 516 to determine whether or not the end of the loop has been reached. If the join weight is larger than the threshold, then the flow proceeds to step 508 to create a new multi-join object and add head join thereto. Also, in step 508, attributes query IDs and sub-query IDs are set. Step 510 includes adding dependent join to the multi-join object by calling addDependentJoins (MultiJoin object, head join location). addDependentJoins is a recursive function that grows multi-join object by exploring the QMJoinMatrix. An example of such is depicted in FIG. 6.

Step 512 includes sorting single joins in this MultiJoin by comparison via MultiJoinComparator. Step 514 includes adding this multi join to the MultiJoinList. Step 516 includes determining whether or not the end of the loop has been reached. If yes, then the flow returns back to step 504, and if not, then the flow proceeds to step 518 to sort multi-joins in the MultiJoinList. Additionally, step 520 includes exiting.

Figure 6:
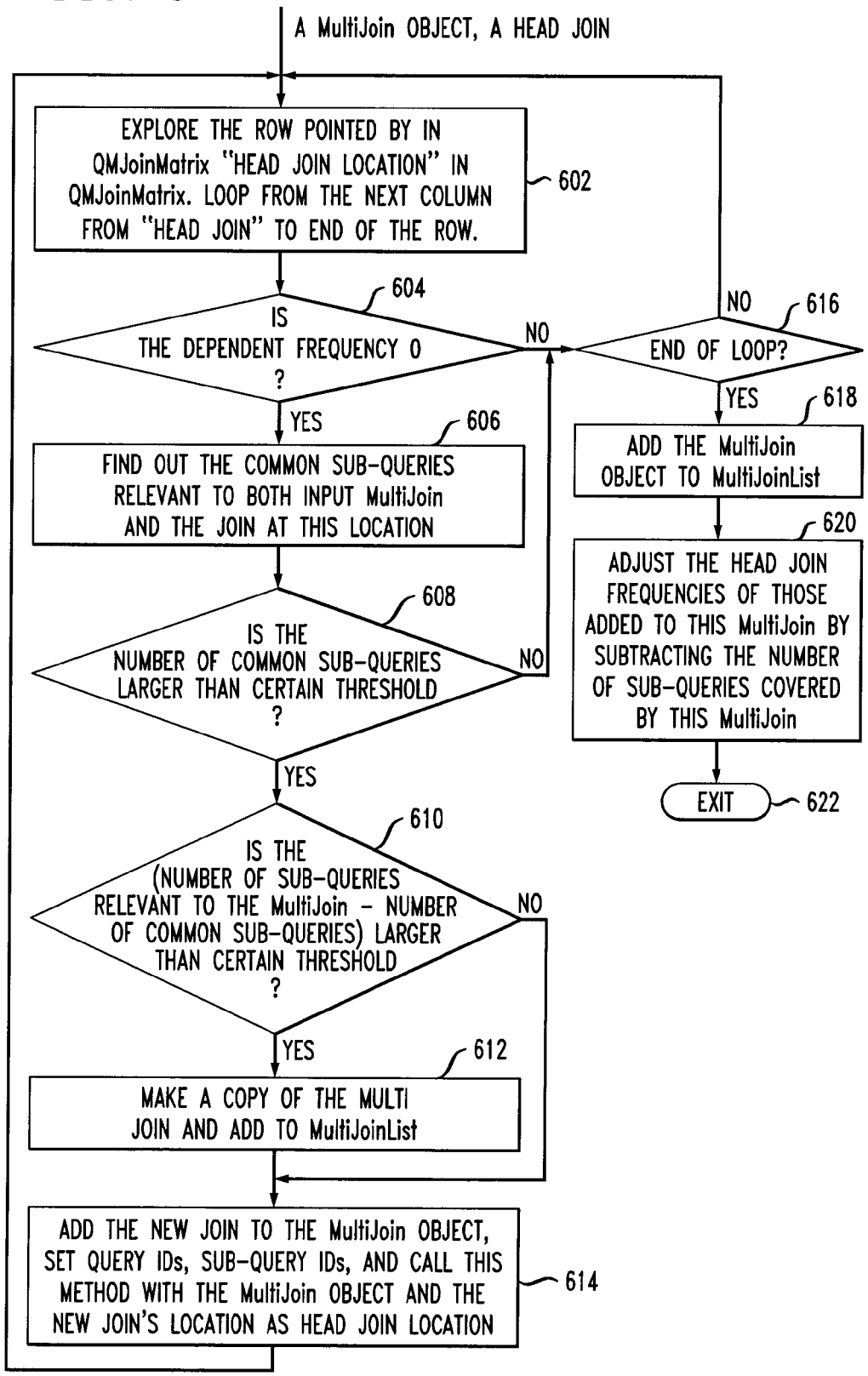
FIG. 6 is a flow diagram illustrating an addDependentJoins function, according to an embodiment of the present invention.

FIG. 6 is a flow diagram illustrating an addDependentJoins function, according to an embodiment of the present invention. One or more embodiments of the invention include receiving a MultiJoin object and a head join, and step 602 includes exploring the row pointed in the QMJoinMatrix "head join location" and looping from the next column from "head join" to the end of the row. Step 604 includes determining whether the dependent frequency is 0. If it is not, then the flow proceeds to step 616 to determine if the end of the loop has been reached. If the dependent frequency is 0, then the flow proceeds to step 606 to find out the common sub-queries relevant to both input MultiJoin and the join at this location.

Step 608 includes determining if the number of common sub-queries is larger than a certain threshold. If it is not, then the flow proceeds to step 616 to determine if the end of the loop has been reached. If the number of common sub-queries is larger than the threshold, then the flow proceeds to step 610 to determine if the number of sub-queries relevant to the MultiJoin minus the number of common sub-queries is larger than a certain threshold. An affirmative answer to step 608 indicates that a new MultiJoin, which would be constructed from adding the new join to the input MultiJoin, covers enough sub-queries (that is, a measure of "importance").

If step 610 is answered in the negative, then the flow proceeds to step 614 to add the new join to the MultiJoin object, set query IDs and sub-query IDs, and call this method with the MultiJoin object and the new join's location as head join location. If step 610 is answered in the affirmative, then the flow proceeds to step 612 to make a copy of the multi-join and add to MultiJoinList. Also, an answer in the affirmative to step 610 indicates that there is enough number of sub-queries coverage difference between the input MultiJoin and the new MultiJoin such that the input MultiJoin should be added to MultiJoinList as is (before adding the new join).

Step 616 includes determining if the end of the loop has been reached. If no, then the flow returns to step 602. If the end of the loop has been reached, the flow proceeds to step 618 to add the MultiJoin object to MultiJoinList. Step 620 includes adjusting the head join frequencies of those added to this MultiJoin by subtracting the number of sub-queries covered by this MultiJoin. Also, step 622 includes exiting.

Figure 7:
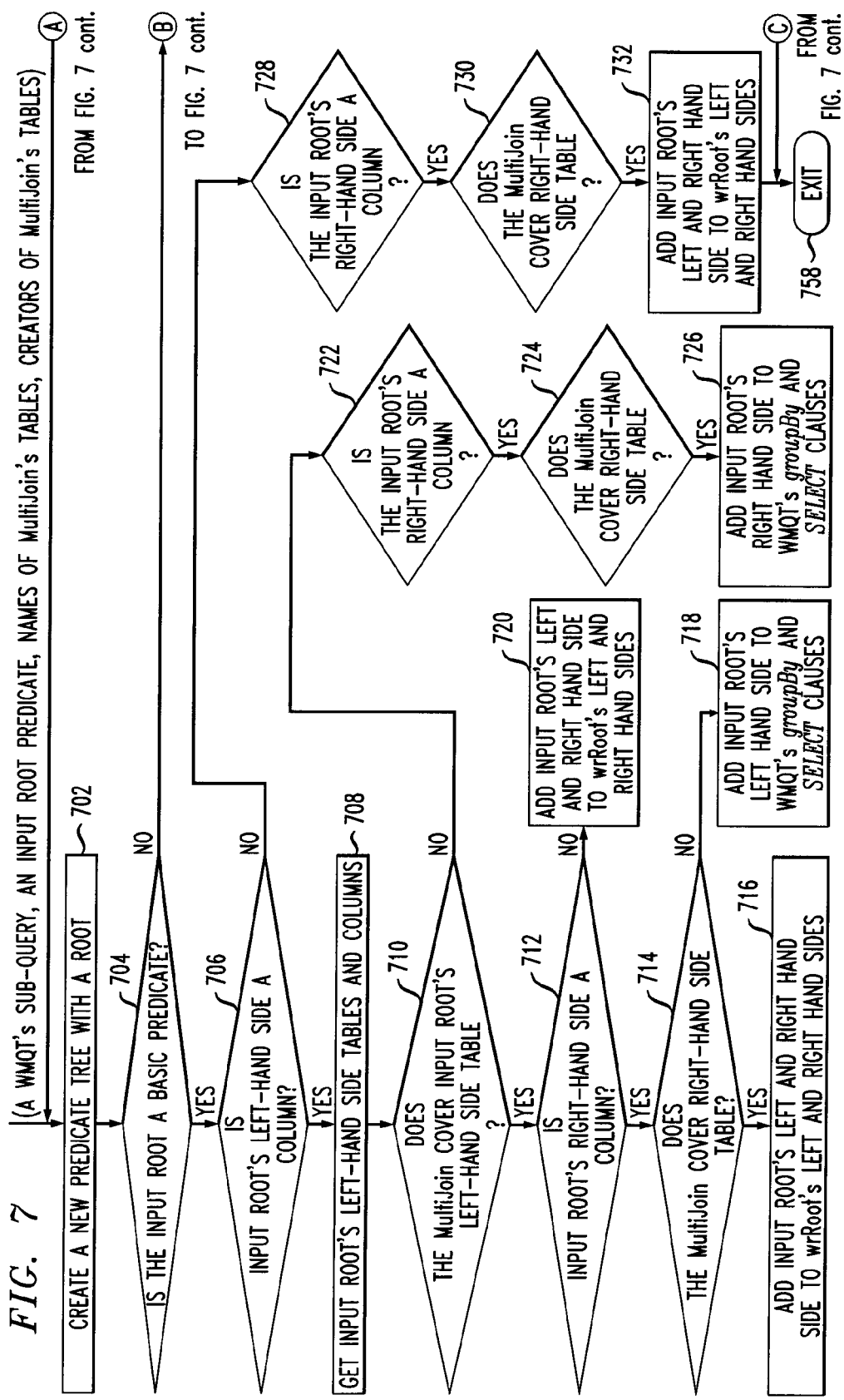
FIG. 7 is a flow diagram illustrating a buildPredicates function, according to an embodiment of the present invention.

FIG. 7 is a flow diagram illustrating a buildPredicates function, according to an embodiment of the present invention. One or more embodiments of the invention include receiving a WMQT's sub-query, an input root predicate, and names of MultiJoin's tables and creators of MultiJoin's tables. A predicate object can be represented by a tree structure with each node as a predicate operator. The two child nodes of a node in the tree can be a literal predicate value, a name of a table column, or a sub-tree that represents another predicate object nested within the current predicate object. A basic predicate has no sub-tree as a child node. Both of its child nodes are either a column name or a literal predicate value. A compound predicate has a sub-tree as one of its child nodes.

Step 702 includes creating a new predicate tree with a root (for example, with only a dummy root). By way of example, this can be referred to as predicate tree object wrRoot. Step 704 includes determining if the input root is a basic predicate. If it is not, then the flow proceeds to step 734 to determine if the root is a compound predicate. If the input root is a basic predicate, then the flow proceeds to step 706 to determine if the input root's left-hand side is a column. If it is not, then the flow proceeds to step 728 to determine if the input root's right-hand side is a column. If the input root's left-hand side is a column, then the flow proceeds to step 708 to obtain the input root's left-hand side tables and columns.

Step 710 includes determining if the MultiJoin covers the input root's left-hand side table. If not, then the flow proceeds to step 722 to determine if the input root's right-hand side is a column. If the MultiJoin covers the input root's left-hand side table, then the flow proceeds to step 712 to determine if the input root's right-hand side is a column. If not, then the flow proceeds to step 720 to add input root's left and right hand side to wrRoot's left and right hand sides. If the input root's right-hand side is a column, then the flow proceeds to step 714 to determine if the MultiJoin covers a right-hand side table. If not, then the flow proceeds to step 718 to add input root's left hand side to WMQT's groupBy and select clauses. If the MultiJoin covers aright-hand side table, then the flow proceeds to step 716 to add input root's left and right hand sides.

As noted above, step 722 includes determining if the input root's right-hand side is a column. If yes, then the flow proceeds to step 724 to determine if the MultiJoin covers the right-hand side table. Also, if step 724 is answered in the affirmative, then the flow proceeds to step 726 to add input root's right hand side to WMQT's groupBy and select clauses. As also noted above, step 728 includes determining if the input root's right-hand side is a column. If yes, the flow proceeds to step 730 determine if the MultiJoin covers the right-hand side table. Also if step 730 is answered in the affirmative, then the flow proceeds to step 732 to add input root's left and right hand side to wrRoot's left and right hand sides, and then on to step 758 to exit.

Additionally, as noted above, step 734 includes determining if the root is a combined predicate. Also, step 736 includes determining if the operator is AND. If not, then the flow proceeds to step 744 to determine if the operator is OR. If the operator is AND, then the flow proceeds to step 738 to add operator AND to wrRoot. Further, step 740 includes iterating through the children of the input root, and step 742 includes adding a child to wrRoot by calling build predicates using the child as the input root.

As noted above, step 744 includes determining if the operator is OR. If yes, then the flow proceeds to step 746 to create a new predicate call or Root and set its operator as OR. Additionally, step 748 includes iterating through the children of the input root, and step 750 includes adding a child wrRoot by calling build predicates using the child as input root. Step 752 includes ending iteration, and step 754 includes determining if orRoot has the same number of children as the input root. If yes, then the flow proceeds to step 756 to add or Root as a child to wrRoot. Also, as noted above, step 758 includes exiting. Further, in one or more embodiments of the invention, only a sub-portion of predicates whose root is OR are kept if all of its children have been kept by consulting input MultiJoin.

Figure 8:
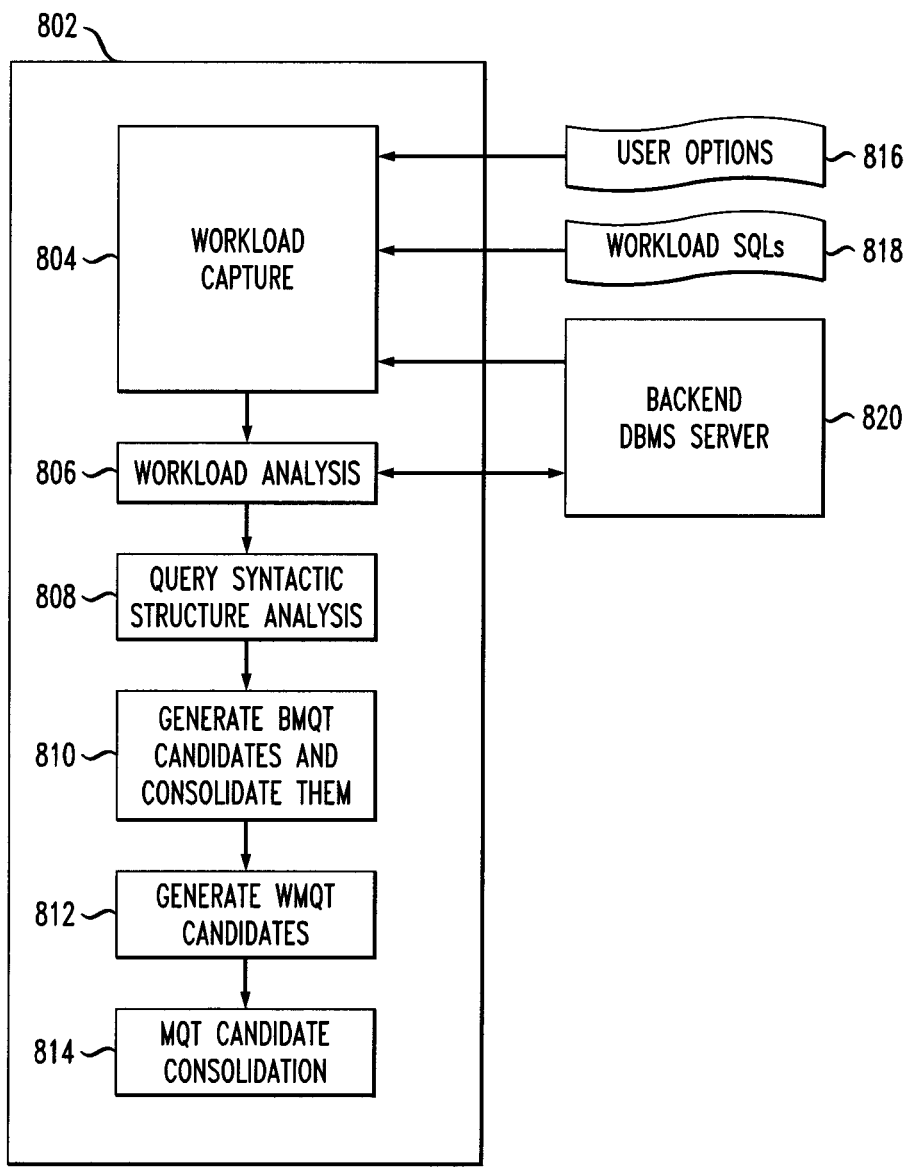
FIG. 8 is a block diagram illustrating an exemplary embodiment, according to an aspect of the invention.

FIG. 8 is a block diagram illustrating an exemplary embodiment, according to an aspect of the invention. FIG. 8 depicts an exemplary tool 802 for generating a set of MQT candidates for a workload. In tool 802, data (for example queries, sub-queries, query blocks, etc.) from components such as a backend DBMS server 820, a user options module 816, a workload structure query language (SQL) module 818, etc. can be input to a workload capture module 804. From there, the data can be sent to a workload analysis module 806 and then to a query syntactic structure analysis module 808. BMQT candidates can then be generated and consolidated via a BMQT generation and consolidation module 810. WMQT candidates can be generated via WMQT generation module 812, and MQT candidates can be consolidated via MQT consolidation module 814.

Figure 9:
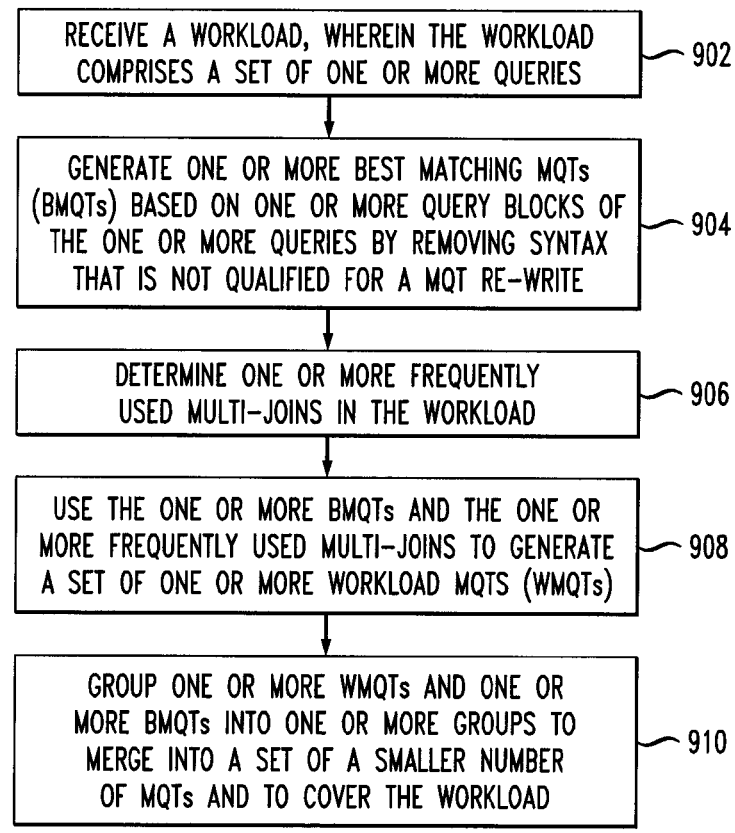
FIG. 9 is a flow diagram illustrating techniques for generating a set of one or more materialized query table (MQT) candidates for a workload, according to an embodiment of the invention.

FIG. 9 is a flow diagram illustrating techniques for generating a set of one or more materialized query table (MQT) candidates for a workload (for example, a database query workload), according to an embodiment of the present invention. Step 902 includes receiving a workload, wherein the workload comprises a set of one or more queries. The techniques depicted in FIG. 9 can also include receiving one or more initial sets of MQTs to be considered for further processing.

Step 904 includes generating one or more best matching MQTs (BMQTs) based on one or more query blocks of the one or more queries by removing syntax that is not qualified for a MQT re-write. Generating a BMQT for a query block of the one or more queries can further include gathering any MQT that a user would like to input as a source of one or more candidates. The query block can include, for example, a subset of queries that are expensive (for example, as deemed by percentage of CPU time, percentage of elapsed time, etc.).

The techniques depicted in FIG. 9 can also include performing pre-consolidation of BMQTs. BMQTs can be pre-consolidated to reduce later MQT candidate search cost. The pre-consolidation process takes those BMQTs with the same projection columns, GROUP BY columns and predicate columns, and merges them into one BMQT with combined predicate literals from all of them if conjunctive or disjunctive rules apply.

Step 906 includes determining one or more frequently used multi-joins in the workload. Determining frequently used multi-joins can include, for example, building a data structure (for example, a matrix) to record join relationship and usage patterns, using the data structure to find a list of commonly used multi-joins, and sorting all multi-joins by defined order criteria (for example, by certain weight functions). Determining frequently used multi-joins in the workload can also include traversing the matrix (for example, recursively or iteratively) to record important common connected multi-joins in the workload based on certain formulated criteria. Also, in one or more embodiments of the invention, connection is dictated by elements in the matrix (for example, elements above a diagonal line of the matrix), and importance is measured by criteria (for example, frequencies and sizes of tables included).

Step 908 includes using the one or more BMQTs and the one or more frequently used multi-joins to generate a set of one or more workload MQTs (WMQTs). Using the BMQTs and frequently used multi-joins to generate a set of WMQTs can include, for example, iterating through each BMQT and its associated query identifier and determining a top (that is, higher weighted) n number of multi-joins that cover each BMQT, and generating the set of WMQTs by adding the same select, aggregation and predicate clauses from a BMQT to the corresponding multi-join. BMQTs have select, aggregation and predicate clauses as they were derived from queries or sub-queries (a query block). WMQT is built from BMQT, and hence some of those clauses from BMQT remain. Additionally, using the BMQTs and frequently used multi-joins to generate a set of WMQTs can include iterating through one or more BMQTs in the workload, identifying a top number of common multi-joins that exist in each BMQT, removing one or more tables that are not in multi-joins from each BMQT if a join from one or more tables to one or more tables in multi-join are lossless, and modifying other operators of the one or more BMQTs to only contain the remaining tables.

Step 910 includes grouping one or more WMQTs and one or more BMQTs into one or more groups to merge into a set of a smaller number of MQTs and to cover the workload. This grouping and consolidation process merges grouped MQTs into a set of a smaller number of MQTs. During this process, in addition to performing merging of select and aggregation columns, one or more embodiments of the invention include looking into predicate distributions in sampled workloads for an appropriate level of consolidation. This is to ensure that the MQT candidates can be repeatedly utilized in future workloads while being conscious or their cost and sizes.

Grouping WMQTs and BMQTs into groups can further include grouping WMQTs, BMQTs and one or more other candidates into groups to merge into a set of a smaller number of MQTs and to cover the workload. Grouping WMQTs and BMQTs into groups to merge into a set of a smaller number of MQTs can include, for example, as noted above, performing merging of select and aggregation columns and examining predicate distributions in sampled workloads to determine an appropriate level of consolidation. Examining predicate distributions in sampled workloads to determine an appropriate level of consolidation can include dividing predicates observed on a column in a sample workload by using the same histogram grouping that the host database management system (DBMS) uses on the column.

Many database management systems (DBMS) today provide histogram statistics on individual columns. Some use, for example, an Equal-Height histogram and some use an Equal-Width histogram. One or more embodiments of the invention include dividing the predicates observed on a column in a sample workload by using the same histogram grouping that the host DBMS uses on the column. For example, assume a histogram statistic divides a column into k variable length range groups. Each range group is associated with histogram frequency $H_i$ (i=1 ... k). One or more embodiments of the invention include correspondingly collecting the predicate distribution $P_i$ (i=1 ... k) among these k groups. One measure to determine whether a histogram range group is "high potential" predicates range is to use the following formula to compute the workload predicate weight $W_i$ of each range group: $W_i=(p_i/(\Sigma_i(P_i)))/H_i/\Sigma_i(H_i))$. The weight values are used to determine the predicate ranges that might be used in MQTs. Ranges with higher weight are preferred to be used over lower weight in MQTs.

The techniques depicted in FIG. 9 can also include analyzing the workload to obtain information, wherein the information includes, for example, table and index statistics, join relationships between joined tables and columns, a number of occurrences of each join in the workload, an association of the queries with joins, referential integrity constraints among tables, etc. Further, one or more embodiments of the invention include modeling one or more join patterns. Modeling join patterns can include, for example, ranking each join by one or more characteristics, recording frequencies of one or more joins in the workload in a data structure (for example, a matrix), and recording a frequency of co-existence in a query of a lower ranked join with respect to a higher ranked join.

The techniques depicted in FIG. 9 can also, as described herein, include providing a system, wherein the system includes distinct software modules, each of the distinct software modules being embodied on a tangible computer-readable recordable storage medium. The distinct software modules can include, for example, a user options module, a workload structure query language (SQL) module, a workload capture module, a workload analysis module, a query syntactic structure analysis module, a BMQT generation and consolidation module, a WMQT generation module, and a MQT consolidation module executing on a hardware processor.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 10:
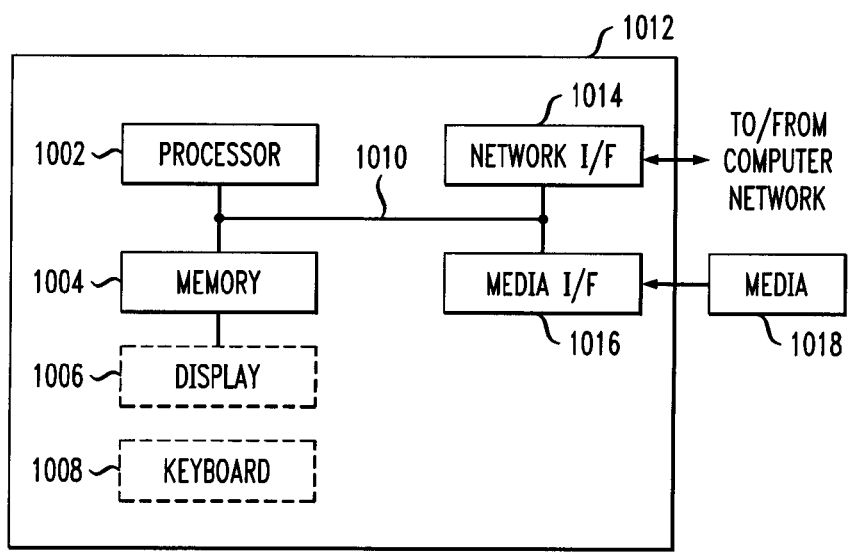
FIG. 10 is a system diagram of an exemplary computer system on which at least one embodiment of the invention can be implemented.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 8. The method steps can then be carried out using the distinct software modules and/or sub-modules of the system, as described above, executing on one or more hardware processors 1002. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, generating an MQT candidate algorithm and generating a broad set of MQT candidates, a subset of the candidates which are actually the queries themselves and a subset which is based on frequently executed multi-joins.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating a set of one or more materialized query table (MQT) candidates for a workload, wherein the method comprises:
   receiving a workload, wherein the workload comprises a set of one or more queries;
   generating one or more best matching MQTs (BMQTs) based on one or more query blocks of the one or more queries by removing syntax that is not qualified for a MQT re-write;
   determining one or more frequently used multi-joins in the workload, wherein said multi-join is a group of tables, wherein any one of the tables in said group of tables is joined to at least one other table within the group of tables, and wherein any table in the group of tables can be accessed from any other table in the group of tables by traversing a path that contains one or more tables in the group and one or more joins that link the tables in the group of tables;
   using the one or more BMQTs and the one or more frequently used multi-joins to generate a set of one or more workload MQTs (WMQTs); and
   grouping one or more WMQTs and one or more BMQTs into one or more groups to merge into a set of a smaller number of MQTs and to cover the workload.

2. The method of claim 1, further comprising receiving one or more initial sets of MQTs to be considered for further processing.

3. The method of claim 1, wherein generating a best matching MQT (BMQT) for a query block of the one or more queries further comprises gathering any MQT that a user would like to input as a source of one or more candidates.

4. The method of claim 1, wherein grouping one or more WMQTs and one or more BMQTs into one or more groups further comprises grouping one or more WMQTs, one or more BMQTs and one or more other candidates into one or more groups to merge into a set of a smaller number of MQTs and to cover the workload.

5. The method of claim 4, wherein grouping one or more WMQTs, one or more BMQTs and one or more other candidates into one or more groups to merge into a set of a smaller number of MQTs comprises performing merging of select and aggregation columns.

6. The method of claim 4, wherein grouping one or more WMQTs, one or more BMQTs and one or more other candidates into one or more groups to merge into a set of a smaller number of MQTs comprises examining predicate distributions in one or more sampled workloads to determine a level of consolidation.

7. The method of claim 6, wherein examining predicate distributions in one or more sampled workloads to determine an appropriate level of consolidation comprises dividing predicates observed on a column in a sample workload by using a same histogram grouping that a host database management system (DBMS) uses on the column.

8. The method of claim 1, further comprising performing pre-consolidation of one or more BMQTs.

9. The method of claim 1, further comprising analyzing the workload to obtain information, wherein the information comprises at least one of table and index statistics, join relationships between joined tables and columns, a number of occurrences of each join in the workload, an association of the queries with joins, and referential integrity constraints among tables.

10. The method of claim 1, wherein determining one or more frequently used multi joins in the workload comprises:
    building a data structure to record join relationship and one or more usage patterns;
    using the data structure to find a list of one or more commonly used multi-joins; and
    sorting all multi joins by defined order criteria.

11. The method of claim 10, wherein the data structure comprises a matrix.

12. The method of claim 11, determining one or more frequently used multi joins in the workload comprises traversing the matrix to record one or more important common connected multi joins in the workload based on criteria.

13. The method of claim 12, wherein connection is dictated by elements in the matrix, and importance is measured by criteria, wherein the criteria comprises at least one of frequencies and sizes of tables included.

14. The method of claim 1, wherein using the one or more BMQTs and the one or more frequently used multi joins to generate a set of one or more WMQTs comprises:
iterating through each BMQT and its associated query identifier and determining a top n number of multi: joins that cover each BMQT; and
generating the set of one or more WMQTs by adding same select, aggregation and predicate clauses from a BMQT to the corresponding multi-join.

15. The method of claim 1, wherein using the one or more BMQTs and the one or more frequently used multi-joins to generate a set of one or more WMQTs comprises:
iterating through one or more BMQTs in the workload;
identifying a top number of common multi joins that exist in each BMQT;
removing one or more tables that are not in multi joins from each BMQT if a join from one or more tables to one or more tables in multi join are lossless; and
modifying other operators of the one or more BMQTs to only contain the remaining tables.

16. The method of claim 1, further comprising modeling one or more join patterns.

17. The method of claim 16, wherein modeling one or more join patterns comprises:
ranking each join by one or more characteristics;
recording frequencies of one or more joins in the workload in a data structure; and
recording a frequency of co-existence in a query of a lower ranked join with respect to a higher ranked join.

18. The method of claim 1, further comprising providing a system, wherein the system comprises one or more distinct software modules, each of the one or more distinct software modules being embodied on a tangible computer-readable recordable storage medium, and wherein the one or more distinct software modules comprise a user options module, a workload structure query language (SQL) module, a workload capture module, a workload analysis module, a query syntactic structure analysis module, a BMQT generation and consolidation module, a WMQT generation module, and a MQT consolidation module executing on a hardware processor.

19. A computer program product comprising a tangible computer readable recordable storage medium including computer useable program code for generating a set of one or more materialized query table (MQT) candidates for a workload, the computer program product including:
computer useable program code for receiving a workload, wherein the workload comprises a set of one or more queries;
computer useable program code for generating one or more best matching MQTs (BMQTs) based on one or more query blocks of the one or more queries by removing syntax that is not qualified for a MQT re-write;
computer useable program code for determining one or more frequently used multi joins in the workload, wherein said multi-join is a group of tables, wherein any one of the tables in said group of tables is joined to at least one other table within the group of tables, and wherein any table in the group of tables can be accessed from any other table in the group of tables by traversing a path that contains one or more tables in the group and one or more joins that link the tables in the group of tables;
computer useable program code for using the one or more BMQTs and the one or more frequently used multi-joins to generate a set of one or more workload MQTs (WMQTs); and
computer useable program code for grouping one or more, WMQTs and one or more BMQTs into one or more groups to merge into a set of a smaller number of MQTs and to cover the workload.

20. The computer program product of claim 19, wherein the computer useable program code for grouping one or more WMQTs, one or more BMQTs and one or more other candidates into one or more groups to merge into a set of a smaller number of MQTs comprises computer useable program code for examining predicate distributions in one or more sampled workloads to determine a level of consolidation.

21. The computer program product of claim 19, further comprising computer useable program code for receiving one or more initial sets of MQTs to be considered for further processing.

22. A system for generating a set of one or more materialized query table (MQT) candidates for a workload, comprising:
a memory; and
at least one processor coupled to the memory and operative to:
receive a workload, wherein the workload comprises a set of one or more queries;
generate one or more best matching MQTs (BMQTs) based on one or more query blocks of the one or more queries by removing syntax that is not qualified for a MQT re-write;
determine one or more frequently used multi joins in the workload, wherein said multi join is a group of tables, wherein any one of the tables in said group of tables is joined to at least one other table within the group of tables, and wherein any table in the group of tables can be accessed from any other table in the group of tables by traversing a path that contains one or more tables in the group and one or more joins that link the tables in the group of tables;
use the one or more BMQTs and the one or more frequently used multi-joins to generate a set of one or more workload MQTs (WMQTs); and
group one or more WMQTs and one or more BMQTs into one or more groups to merge into a set of a smaller number of MQTs and to cover the workload.

23. The system of claim 22, wherein the at least one processor coupled to the memory operative to group one or more WMQTs, one or more BMQTs and one or more other candidates into one or more groups to merge into a set of a smaller number of MQTs is further operative to examine predicate distributions in one or more sampled workloads to determine a level of consolidation.

24. The system of claim 22, wherein the at least one processor coupled to the memory is further operative to receive one or more initial sets of MQTs to be considered for further processing.

* * * * *